(12) United States Patent
Black et al.

(10) Patent No.: US 10,815,720 B2
(45) Date of Patent: Oct. 27, 2020

(54) PASSIVE FILTER FOR LASER PROTECTION

(71) Applicant: BAE Systems plc, London (GB)

(72) Inventors: Daniel Benjamin Black, Chelmsford (GB); Mohammed-Asif Akhmad, Chelmsford (GB); Leslie Charles Laycock, Chelmsford (GB)

(73) Assignee: BAE Systems plc, London (GB)

( * ) Notice: Subject to any disclaimer, the term of this patent is extended or adjusted under 35 U.S.C. 154(b) by 77 days.

(21) Appl. No.: 16/087,116

(22) PCT Filed: Mar. 17, 2017

(86) PCT No.: PCT/GB2017/050741
§ 371 (c)(1),
(2) Date: Sep. 21, 2018

(87) PCT Pub. No.: WO2017/163028
PCT Pub. Date: Sep. 28, 2017

(65) Prior Publication Data
US 2019/0093420 A1      Mar. 28, 2019

(30) Foreign Application Priority Data

Mar. 24, 2016   (GB) .................................. 1604994.2
Nov. 23, 2016   (GB) .................................. 1619767.5

(51) Int. Cl.
*B60J 3/00*     (2006.01)
*E06B 3/67*     (2006.01)
(Continued)

(52) U.S. Cl.
CPC .............. *E06B 3/6722* (2013.01); *B60J 1/02* (2013.01); *B60J 3/007* (2013.01); *B60Q 9/00* (2013.01);
(Continued)

(58) Field of Classification Search
CPC .................................. A61F 9/022; B60J 3/007
See application file for complete search history.

(56) References Cited

U.S. PATENT DOCUMENTS 4,786,125 A   11/1988   Magarinos
4,879,167 A   11/1989   Chang
(Continued)

FOREIGN PATENT DOCUMENTS

CN      101758227 A1   6/2010
EP        2602655 A1   12/2013
(Continued)

OTHER PUBLICATIONS

PCT Search Report and Written Opinion for Appl No. PCT/GB2017/050741 dated May 23, 2017, 13 pages.
(Continued)

*Primary Examiner* — Thanh Luu
(74) *Attorney, Agent, or Firm* — Maine Cernota & Rardin

(57) ABSTRACT

There is disclosed a filter for a vehicle window comprising a layer of filter material, the layer of filter material being for substantially preventing the transmission of radiation at a first predetermined visible wavelength band, the first predetermined visible wavelength band covering the wavelength of a predetermined laser threat, whilst substantially allowing visible wavelengths outside of the band to be transmitted, such that the filter can offer a visible light transmission of at least 70%, and a radiation detector, such that radiation at the first predetermined wavelength band can be detected.

19 Claims, 2 Drawing Sheets

(51) Int. Cl.
  *G02B 5/28* (2006.01)
  *G02B 5/20* (2006.01)
  *G02B 1/00* (2006.01)
  *B60J 1/02* (2006.01)
  *B60Q 9/00* (2006.01)
  *E06B 9/24* (2006.01)
  *G01J 1/04* (2006.01)
  *G01J 1/42* (2006.01)

(52) U.S. Cl.
  CPC .............. *E06B 9/24* (2013.01); *G01J 1/0488* (2013.01); *G02B 1/005* (2013.01); *G02B 5/20* (2013.01); *G02B 5/28* (2013.01); *B60Y 2200/11* (2013.01); *B60Y 2200/143* (2013.01); *B60Y 2200/30* (2013.01); *B60Y 2200/50* (2013.01); *E06B 2009/2417* (2013.01); *G01J 1/42* (2013.01)

(56) References Cited

U.S. PATENT DOCUMENTS

| | | | |
|---|---|---|---|
| 4,963,471 | A | 10/1990 | Trout |
| 5,103,323 | A | 4/1992 | Magarinos |
| 5,412,439 | A * | 5/1995 | Horn ............... G02C 7/101 351/158 |
| 5,539,544 | A | 7/1996 | Le Paih et al. |
| 5,966,240 | A | 10/1999 | Lange et al. |
| 6,411,451 | B1 | 6/2002 | Fliss et al. |
| 7,683,310 | B1 | 3/2010 | Sinclair et al. |
| 9,958,583 | B1 | 5/2018 | Brown |
| 2005/0162575 | A1* | 7/2005 | Harvie ............ G02B 27/017 349/16 |
| 2008/0186565 | A1 | 8/2008 | Kreig-Kowald |
| 2009/0268157 | A1 | 10/2009 | Kreig-Kowald et al. |
| 2010/0128356 | A1 | 5/2010 | Feklistov |
| 2010/0149483 | A1 | 6/2010 | Chiavetta, III |
| 2012/0008217 | A1 | 1/2012 | Ishak et al. |
| 2013/0215499 | A1 | 8/2013 | Wang et al. |
| 2014/0009827 | A1 | 1/2014 | Simon et al. |
| 2014/0293467 | A1* | 10/2014 | Palikaras ........... G02B 5/0825 359/885 |
| 2015/0060652 | A1* | 3/2015 | Volfson ............ G01J 1/0266 250/227.11 |
| 2015/0268396 | A1 | 9/2015 | Weber et al. |
| 2015/0338683 | A1* | 11/2015 | Perricone ........... G02B 1/041 351/49 |

FOREIGN PATENT DOCUMENTS

| | | | |
|---|---|---|---|
| JP | 055804 | A | 1/1993 |
| WO | 19830004317 | A1 | 12/1983 |
| WO | 2003060443 | A1 | 7/2003 |
| WO | 20060073408 | A2 | 7/2006 |
| WO | 2010068541 | A1 | 6/2010 |
| WO | 2010077411 | A1 | 7/2010 |
| WO | 20130054115 | A1 | 4/2013 |
| WO | 20150179474 | A1 | 11/2015 |
| WO | 20170163027 | A1 | 9/2017 |
| WO | 20170163028 | A1 | 9/2017 |
| WO | 20170163031 | A1 | 9/2017 |
| WO | 20170163033 | A1 | 9/2017 |

OTHER PUBLICATIONS

GB Search Report for Appl No. GB1604994.2 dated Sep. 26, 2016, 3 pages.
GB Search Report for Appl No. GB1619767.5 dated May 8, 2017, 7 pages.
GB Search Report for Appl No. GB1619763.4 dated May 3, 2017, 11 pages.
GB Search Report for Appl No. GB1604995.9 dated Sep. 26, 2016, 4 pages.
PCT Search Report and Written Opinion for Appl No. PCT/GB2017/050740 dated May 26, 2017, 14 pages.
GB Search Report for Appl No. GB1619764.2 dated May 3, 2017, 9 pages.
PCT Search Report and Written Opinion for Appl No. PCT/GB2017/050754 dated May 26, 2017, 13 pages.
GB Search Report for Appl No. GB1619765.9 dated May 9, 2017, 9 pages.
PCT Search Report and Written Opinion for Appl No. PCT/GB2017/050766 dated May 24, 2017, 13 pages.
International Preliminary Report on Patentability for Appl No. PCT/GB2017/050740 dated Sep. 25, 2018, 9 pages.
International Preliminary Report on Patentability for Appl No. PCT/GB2017/050754 dated Sep. 25, 2018, 8 pages.
International Preliminary Report on Patentability for Appl No. PCT/GB2017/050766 dated Sep. 25, 2018, 8 pages.
International Preliminary Report on Patentability for Appl No. PCT/GB2017/050741 dated Sep. 25, 2018, 8 pages.
Office Action for U.S. Appl. No. 16/087,124, dated Jul. 13. 2020, 28 Pages.
Office Action for U.S. Appl. No. 16/087,140, dated Jul. 14, 2020, 30 Pages.
Office Action dated Jun. 25, 2020 for U.S. Appl. No. 16/087,133, 31 Pages.

* cited by examiner

PASSIVE FILTER FOR LASER PROTECTION

RELATED APPLICATIONS

This application is a national phase application filed under 35 USC § 371 of PCT Application No. PCT/GB2017/050741 with an International filing date of Mar. 17, 2017, which claims priority of GB Patent Application 1604994.2 filed on Mar. 24, 2016 and GB Patent Application 1619767.5 filed on Nov. 23, 2016. Each of these applications is herein incorporated by reference in its entirety for all purposes.

FIELD OF THE INVENTION

The present invention relates to a filter, and also to a window for a vehicle, the window comprising such a filter.

BACKGROUND OF THE INVENTION

It is known from US2014/0293467 to provide a generally transparent filter comprising a nanoparticle metamaterial structure such that a particular wavelength of electromagnetic radiation may be blocked. The use of such a filter at the windscreen (or windshield) of an aircraft protects against laser threats, which may damage pilot eyesight or temporarily dazzle the pilot.

SUMMARY

According to the invention there is provided a passive filter for a vehicle window comprising a layer of filter material, the layer of filter material being for substantially preventing the transmission of radiation at a first predetermined visible wavelength band, the first predetermined visible wavelength band covering the wavelength of a predetermined laser threat, whilst substantially allowing visible wavelengths outside of the band to be transmitted, such that the filter can offer a visible light transmission of at least 70%, and a radiation detector arranged and configured in respect of said layer of filter material to detect radiation in the first predetermined wavelength band incident thereon and substantially blocked thereby.

Thus, should the filter succeed in blocking laser dazzle, the existence of the threat can still be detected.

The filter can optionally have a visible light transmission of at least 80% and may even be provided with a visible light transmission of 90%.

The radiation detector may comprise a detector layer, the detector layer being mounted on the layer of filter material.

Thus an integrated filter can be provided which is suitable for retrofit to existing windows.

The radiation detector may comprise an array of photodetector elements.

As such the detector has the option of collecting data relating to which photodetector elements have been illuminated and to what intensity. In such instances, the signals received from each photodetector element could be uniquely identifiable as originating from such element (e.g. by a unique connection to a unique port on a processor module).

The radiation detector may comprise a photodetector element at a boundary of and generally co-planar with the layer of filter material.

Thus the detector can be kept wholly out of the operator or operator's line of view and as such provides that larger or less inconspicuous photodetectors or sensing elements can be used.

The filter may further comprise a processor module connected to the radiation detector, and a user alert module connected so the processor module such that an alert may be issued in the event of a detected laser threat.

As such, should a laser threat be so effectively suppressed, there can still be identification and notification of the threat.

The filter may comprise an interference filter configured to inhibit transmission at the or each predetermined wavelength band and formed by holographic exposure of a photosensitive film or films by one or more lasers.

Such forms of filter can provide for the suppression of multiple narrow band wavelengths in the same material.

The filter may be additionally for preventing transmission of radiation in a second predetermined wavelength band, the second predetermined wavelength band covering the wavelength of a second predetermined laser threat.

The filter may be for additionally preventing radiation in a third predetermined visible radiation band, the third predetermined wavelength band covering the wavelength of a third predetermined laser threat.

The filter may be for preventing radiation from no more than three predetermined radiation bands.

As such more than one laser wavelength can be defended against.

The filter may be comprised by a single layer of material adapted or configured for preventing the transmission of the predetermined visible wavelength band or bands.

Typically the bandwidth of at least one of the predetermined bands is 10 nm, but it may alternatively be 5 nm.

The filter may have an optical density of at least 2 at the first predetermined wavelength band. Where a plurality of predetermined wavelength bands are filtered by the filter, the optical density at each filter may be different according to the relative threat of that wavelength.

The filter may have an optical density of at least 2 at each predetermined wavelength band.

Such an optical density has been determined experimentally to be a suitable level of protection to defend against attacks from high power lasers (c. 3W) in aerospace contexts.

The filter may be provided as a conformal film for coupling to a window to further adapt the filter for convenient retrofit.

According to a further aspect of the invention, there is provided a multi-layered window comprising a filter according to the first aspect, wherein the filter is interposed between layers of the window.

According to a still further aspect of the invention, there is provided a window for a vehicle, the window comprising a filter according to the first or further aspect of the invention.

BRIEF DESCRIPTION OF THE DRAWINGS

So that the invention may be well understood, exemplary embodiments thereof shall now be discussed with reference to the following figures, of which

DETAILED DESCRIPTION

Figure 1:
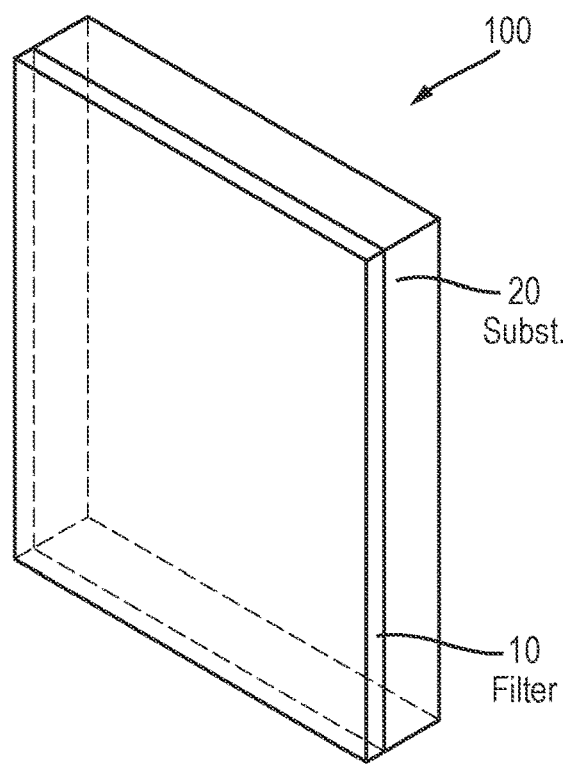
FIG. 1 shows a three-dimensional view of a known filter material applied to a substrate.

With reference to FIG. 1 there is shown a prior art filter 10 applied to a first face of a substrate 20 to provide a window 100 adapted for mitigating laser threats such as dazzle. The filter 10 may be formed from metamaterials according to known practice. The substrate 20 is substantially transmissive of visible light (for example it may have a visible light transmission (VLT %) of around 90% of normally incident light) and may be formed for example from a glass or a plastics material such as polycarbonate.

Figure 2:
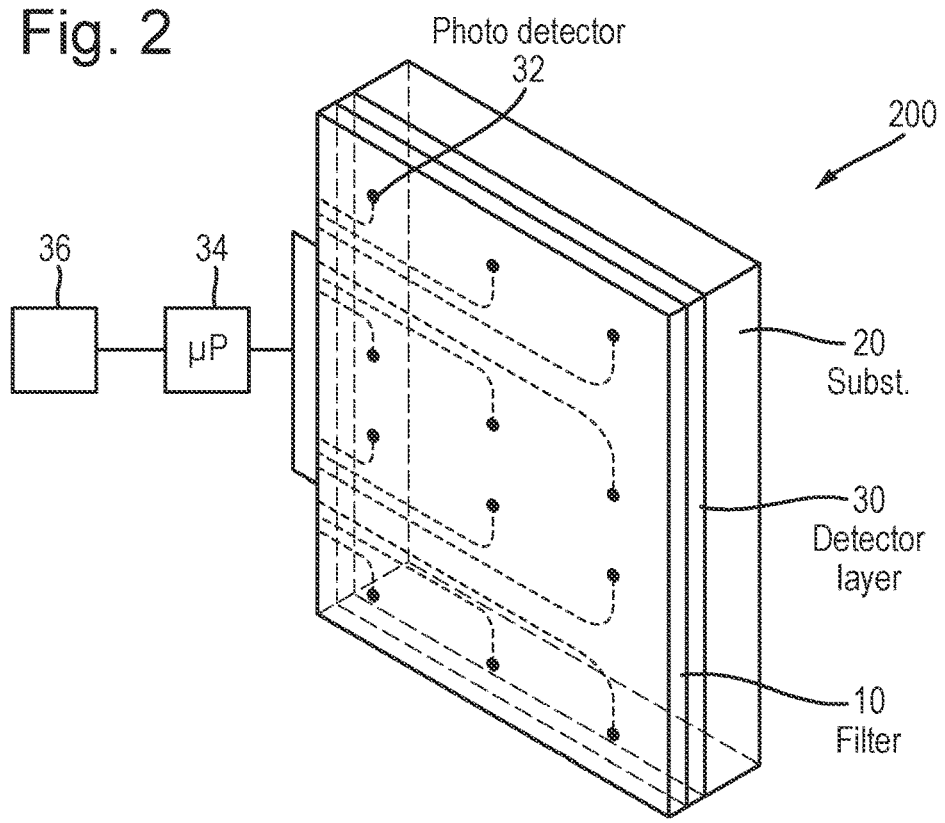
FIG. 2 shows a three-dimensional view of a filter according to the present invention.

With reference to FIG. 2 there is shown generally at 200 a window. The window 200 comprises a transparent substrate 20 to a first face of which has been coupled a radiation detector in the form of a detector layer 30.

Coupled to the opposite face of the detector layer 30 there is provided a layer of filter material 10.

As such the substrate 20, detector layer 30 and filter material 10 can be considered as a stacked multi-layer structure.

The detector layer 30 comprises an array of photodetectors 32 distributed so as to extend substantially across the window 200. The photodetectors 32 are sufficiently small to be substantially invisible to the casual observer (though in practice there may be some reduction on the VLT %). Each photodetector is electrically connected to a processor module 34. In some embodiments, including the present one, each photodetector is uniquely connected to a unique port on the processor module 34.

The processor module 34 is in turn connected to an alert module 36.

Figure 3:
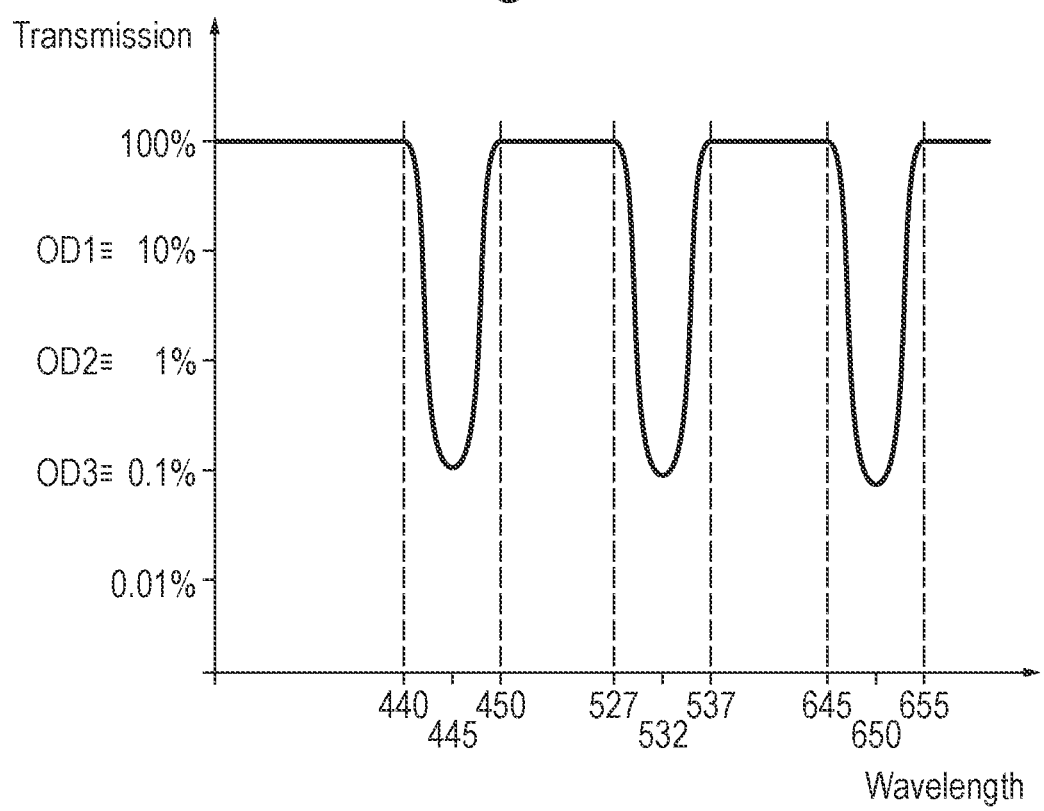
FIG. 3 shows a graph where the generalised transmission characteristic of a filter material suitable for use in the filter is plotted.

A suitable transmission characteristic (which may alternatively be referred to as the transfer function) of visible electromagnetic radiation incident for the filter 10 is illustrated in FIG. 3. The transmission intensity relative to incident radiation intensity is shown on the y-axis and the wavelength of the incident radiation is shown on the x-axis.

As can be seen on the plot, across the range of wavelengths the intensity of the transmitted radiation is close to 100% of that which is incident.

However there are three distinct notches in the transmission characteristic associated with three wavelength bands. These are in particular a 10 nm band centred on 455 nm, a 10 nm band centred on 532 nm and a 10 nm band centred on 650 nm. In general any three notches from the group consisting of 405 nm, 455 nm, 520 nm, 532 nm, and 650 nm may be selected. Further, notches may be chosen to coincide with any expected laser threat wavelength. Still further, the bandwidth may be 5 nm.

At the centre of each of these bands, the intensity of the transmitted radiation is at a minimum and has an optical density of approximately 3, which is equivalent to 0.1% of the initially incident radiation.

Figure 4:
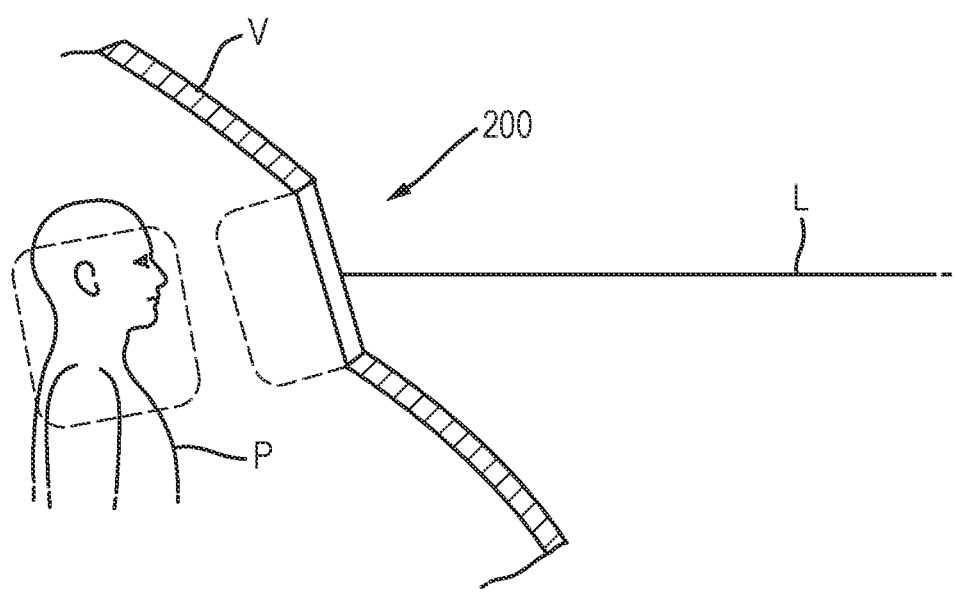
FIG. 4 shows the filter of FIG. 2 implemented on the windscreen of a vehicle.

FIG. 4 shows a window 200 as shown in FIG. 2 deployed as a windscreen on a vehicle V, which in this example is an aircraft. A pilot P is positioned behind the windscreen and a laser beam L, having a wavelength of 532 nm, is shown pointing at the windscreen. Laser beam L will have some degree of divergence as the beam propagates through the atmosphere, which will result in a certain 'spot size' observed at the windscreen.

In use the window 200 may be used to mitigate the effects of the laser beam L, and alert the pilot to the existence of the laser threat.

In particular, as the laser beam L propagates onto the window 200 it will pass through the substrate 20 and into the detector layer 30 where some laser light will fall on one or more of the photodetectors 32 (depending on spot size).

The laser light subsequently propagates from the detector layer 30 and on the filter 10 where the light becomes substantially attenuated. Assuming the filter 10 to have the transmission characteristics shown in FIG. 3 and the laser beam L to be a green laser at 532 nm, the laser beam L will be attenuated to 0.1% of its original intensity.

Accordingly, the pilot P is able to look out of the windscreen with a reduced chance of the laser beam L harming his or her sight, or distracting him or her from flying the plane safely.

Meanwhile, the laser light having fallen on certain photodetectors 32, an electrical signal is generated at each illuminated detector 32 and sent to the processing unit 34. At the processing unit 34 the electrical signals received from the illuminated photodetectors 32 are analysed to confirm or deny the detection of a laser beam. In this case, the processing module 36 generates a signal confirming the presence of the laser beam and relays this to the alert module 36.

Each photodetector 32 can have a unique location at the filter, registered with the processor module such that signals from each photodetector 32 can be correlated with a certain location at the filter. Further this location can be correlated with a particular point on the window provided the relationship between the window and the filter is registered at the processing module. Thus the processing module can determine, from detecting which photodetectors are illuminated, not only the presence of a threat but also the general dimensions of the 'spot' and where on the window the illumination is occurring. Some information relating to the source of the threat can be derived from such measurements. If embodiments are provided with layers of photodetectors, it may be possible to establish more confident estimates of the threat location.

In the present embodiment the photodetectors 32 are configured for detecting radiation at the predetermined wavelength or predetermined wavelengths. For example the photodetector 32 could be configured to send a signal only if 527-537 nm radiation illuminated it. As such the system needs less noise-rejection provisions and/or can provide fewer false positive signals.

Upon receiving the signal confirming the presence of the laser beam, the alert module issues an alert to notify the pilot P (or another operator) of the laser beam. Such alert could be a visual alert (for instance on an instrument in the cockpit) and/or an audible alert. Such alert could be a signal sent (e.g. by an RF transmitter within the alert module) to a further aircraft or a further element of aerospace infrastructure such as an Air Traffic Control base.

Accordingly, should the pilot be otherwise unaware of the laser beam (for instance because it is sufficiently attenuated by the filter 10 to be negligible within the vehicle) the alert will inform as to the existence of the threat and further action (reporting to ground based security personnel, warning other aircraft) can be taken to address or remove the threat.

The above discussion has provided an overview of how the present invention may mitigate the threat of laser beams.

Presently various lasers are commercially available which could be used against a number of targets at a number of different stand-off ranges. The likely distance and the power of the laser determine how effective the filter needs to be in order to prevent injury to the onlooker. An intensity-at-eyeball of 0.001 W/cm$^2$ or less should be sufficient to prevent eye damage.

Table 1 shows, for a 3 W laser with 0.5 mrad beam divergence and no atmospheric loss at various stand-off distances, the calculated minimum optical densities (OD) such that damage to the eye can be avoided by blinking (i.e. damage is negligible at this OD unless exposure is greater than 0.5 s, which is a determined minimum multiplied by a factor of safety of 2), and such that there is enough protection to render negligible the risk of damage from a 10 second exposure. Accordingly suggested ranges for ODs are proposed.

TABLE 1

| Distance (m) | Beam diameter (mm) | 'Spot' Size (mm²) | Intensity (W/Cm²) | Typical application | min OD for 0.5 s exposure | min OD for 10 s exposure | Example OD ranges (to nearest 0.5) |
|---|---|---|---|---|---|---|---|
| 0 | 3 | 7.1 | 42.4 | n/a | 4.03 | 4.63 | 4.5-6.0 |
| 5 | 6 | 23.8 | 12.6 | Car/train/bus | 3.50 | 4.10 | 3.5-5.5 |
| 10 | 8 | 50.3 | 6.0 | Car/train/bus | 3.18 | 3.78 | 3.5-5.5 |
| 50 | 28 | 615.8 | 0.5 | Car/train/bus/aircraft | 2.10 | 2.70 | 2.5-4.0 |
| 100 | 53 | 2206.2 | 0.1 | Car/train/bus/aircraft | 1.40 | 2.00 | 1.5-3.5 |
| 500 | 253 | 50272.6 | 0.006 | Aircraft | 0.18 | 0.78 | 0.5-2.5 |
| 1000 | 503 | 198712.8 | 0.002 | Aircraft | n/a | 0.30 | 0-1.5 |

Table 2 shows, for a 1 W laser with 1.2 mrad beam divergence and no atmospheric loss at various stand-off distances, the calculated minimum optical densities (OD) such that damage to the eye can be avoided by blinking (i.e. damage is negligible at this OD unless exposure is greater than 0.5 s, which is a determined minimum multiplied by a factor of safety of 2), and such that there is enough protection to render negligible the risk of damage from a 10 second exposure. Accordingly suggested ranges for ODs are proposed.

TABLE 2

| Distance (m) | Beam diameter (mm) | 'Spot' size (mm2) | Intensity (W/Cm2) | Typical application | min OD for 0.5 s exposure | min OD for 10 s exposure | Example OD ranges (to nearest 0.5) |
|---|---|---|---|---|---|---|---|
| 0 | 3 | 7.1 | 14.1 | n/a | 3.55 | 4.15 | 4.0-5.5 |
| 5 | 9 | 63.6 | 1.57 | Car/train/bus | 2.59 | 3.20 | 3.0-4.5 |
| 10 | 15 | 176.7 | 0.57 | Car/train/bus | 2.15 | 2.76 | 2.5-4.5 |
| 50 | 63 | 3117.3 | 0.03 | Car/train/bus/aircraft | 0.88 | 1.48 | 1.0-3.0 |
| 100 | 123 | 11882.3 | 0.008 | Car/train/bus/aircraft | 0.30 | 0.90 | 0.5-2.5 |
| 500 | 603 | 285577.8 | 0.0004 | Aircraft | n/a | n/a | 0.5-1.5 |
| 1000 | 1203 | 1136635.3 | 0.00009 | Aircraft | n/a | n/a | n/a |

These experiments show that an optical density of 2 would tend to provide sufficient attenuation for aerospace applications, where attackers would struggle to get within 100 m of the aircraft.

So that the dazzle can be prevented (dazzle being where the vision of the operator is temporarily impaired by the laser light but not permanently damaged) the OD values given in Table 1 or Table 2 should be increased in each scenario by 1, or more preferably 1.5 (i.e. and OD of 1 should become and OD of 2 or 2.5 to prevent dazzle).

In a variant of the radiation detector shown in FIG. 2, the radiation detector may have the form of a patch arranged in the plane of the filter, or in other words at or near a boundary of the filter. Said patch could comprise an localised photo-detector or array thereof and would be interfaced with the processor module and alert module in an equivalent manner. This approach would be suited to contexts where the spot size of the laser was sufficiently large to illuminate the periphery of the window, so that the patch need not be positioned in the operator's view. As an alternative to the patch, the detector could extend about the entire periphery of the filter.

The filter 10 can be formed in any known way. Alternatively the filter could be formed by a holographic process where a photosensitive substrate (e.g. polymeric film) is exposed by one or more lasers.

In a variant of the window and substrate arrangement of FIG. 2, the window may be comprised by a number of laminar substrates between which could be positioned the filter and detector of the present invention.

The invention claimed is:
1. A passive filter for a vehicle window comprising:
   a layer of filter material;
   the layer of filter material being for substantially preventing the transmission of radiation at a first predetermined visible wavelength band;
   the first predetermined visible wavelength band covering the wavelength of a predetermined laser threat, whilst substantially allowing visible wavelengths outside of the band to be transmitted;
   such that the filter can offer a visible light transmission of at least 70%; and
   a radiation detector arranged and configured in respect of said layer of filter material to detect radiation in the first predetermined wavelength band incident thereon and substantially blocked thereby; wherein the radiation detector extends solely about the periphery of the filter; and wherein the radiation detector comprises:
a plurality of detector layers, each detector layer comprising detectors; whereby a location of the threat is established based at least in-part on relative locations of detectors within different detector layers.

2. The filter according to claim 1 wherein the detector layers are mounted on the layer of filter material.

3. The filter according to claim 1 wherein the radiation detector comprises an array of photodetector elements.

4. The filter according to claim 1 further comprising a processor module connected to the radiation detector, and a user alert module connected so the processor module such that an alert may be issued in the event of a detected laser threat.

5. The filter according to claim 1 wherein the filter comprises an interference filter configured to inhibit transmission at the or each predetermined wavelength band and formed by holographic exposure of a photosensitive film or films by one or more lasers.

6. The filter according to claim 1 wherein the filter is additionally for preventing transmission of radiation in a second predetermined wavelength band, the second predetermined wavelength band covering the wavelength of a second predetermined laser threat.

7. The filter according to claim 1 wherein the filter is for additionally preventing radiation in a third predetermined visible radiation band, the third predetermined wavelength band covering the wavelength of a third predetermined laser threat.

8. The filter according to claim 1 wherein the filter is for preventing radiation from no more than three predetermined radiation bands.

9. The filter according to claim 1 wherein the filter is comprised by a single layer of material adapted or configured for preventing the transmission of the predetermined visible wavelength band or bands.

10. The filter according to claim 1 wherein the bandwidth of at least one of a predetermined wavelength band is 10 nm.

11. The filter according to claim 1 wherein the filter has an optical density of at least 2 at the first predetermined wavelength band.

12. The filter according to claim 1 wherein the filter has an optical density of at least 2 at each of a predetermined wavelength band.

13. The filter according to claim 1 wherein the filter is provided as a conformal film for coupling to a window.

14. A multi-layered window comprising a passive filter for a vehicle window comprising:
a layer of filter material;
the layer of filter material being for substantially preventing the transmission of radiation at a first predetermined visible wavelength band;
the first predetermined visible wavelength band covering the wavelength of a predetermined laser threat, whilst substantially allowing visible wavelengths outside of the band to be transmitted;
such that the filter can offer a visible light transmission of at least 70%;
a radiation detector arranged and configured in respect of said layer of filter material to detect radiation in the first predetermined wavelength band incident thereon and substantially blocked thereby;
wherein the radiation detector comprises:
a plurality of detector layers, each detector layer comprising detectors; whereby a location of the threat is established based at least in-part on relative locations of detectors within different detector layers; and
wherein the filter is interposed between layers of the window.

15. The multi-layered window according to claim 14 wherein the detector layers are mounted on the layer of filter material.

16. The multi-layered window according to claim 14 wherein the detector layers are at a boundary of and generally co-planar with the layer of filter material.

17. The multi-layered window according to claim 14 wherein the detector layers comprise a patch arranged in a plane of the filter.

18. The multi-layered window according to claim 14 wherein the detector layers and filter material comprise a stacked multi-layer structure.

19. A window for a vehicle, the window comprising a passive filter for a vehicle window comprising:
a layer of filter material;
the layer of filter material being for substantially preventing the transmission of radiation at a first predetermined visible wavelength band;
the first predetermined visible wavelength band covering the wavelength of a predetermined laser threat, whilst substantially allowing visible wavelengths outside of the band to be transmitted;
such that the filter can offer a visible light transmission of at least 70%;
a radiation detector arranged and configured in respect of said layer of filter material to detect radiation in the first predetermined wavelength band incident thereon and substantially blocked thereby;
wherein the radiation detector extends solely about the periphery of the filter; and
wherein the radiation detector comprises:
a plurality of detector layers, each detector layer comprising detectors; whereby a location of the threat is established based at least in-part on relative locations of detectors within different detector layers.

* * * * *